United States Patent
Ozawa (10) Patent No.: US 9,942,553 B2
(45) Date of Patent: Apr. 10, 2018

(54) COMMUNICATION SYSTEM, METHOD AND PROGRAM

(71) Applicant: NEC Corporation, Tokyo (JP)

(72) Inventor: Kazunori Ozawa, Tokyo (JP)

(73) Assignee: NEC Corporation, Tokyo (JP)

( * ) Notice: Subject to any disclaimer, the term of this patent is extended or adjusted under 35 U.S.C. 154(b) by 492 days.

(21) Appl. No.: 14/416,498

(22) PCT Filed: Jul. 23, 2013

(86) PCT No.: PCT/JP2013/069874
§ 371 (c)(1),
(2) Date: Jan. 22, 2015

(87) PCT Pub. No.: WO2014/017468
PCT Pub. Date: Jan. 30, 2014

(65) Prior Publication Data
US 2015/0181215 A1 Jun. 25, 2015

(30) Foreign Application Priority Data

Jul. 24, 2012 (JP) .................................. 2012-163958

(51) Int. Cl.
*H04N 7/12* (2006.01)
*H04N 19/156* (2014.01)
(Continued)

(52) U.S. Cl.
CPC ....... *H04N 19/156* (2014.11); *H04L 43/0894* (2013.01); *H04L 47/38* (2013.01); *H04L 67/04* (2013.01)

(58) Field of Classification Search
CPC .............................. G09G 5/39; G09G 2340/02
(Continued)

(56) References Cited

U.S. PATENT DOCUMENTS

2005/0071876 A1* 3/2005 van Beek ............. H04N 19/159
725/62
2007/0165524 A1 7/2007 Mascolo
(Continued)

FOREIGN PATENT DOCUMENTS

CN        101304537 A      11/2008
CN        102123303 A       7/2011
(Continued)

OTHER PUBLICATIONS

Japanese Notification of First Office Action issued in corresponding Japanese Patent Application No. 201380039696.2, dated Nov. 28, 2016, 25 pages.
(Continued)

*Primary Examiner* — Jamie Atala
*Assistant Examiner* — Masum Billah
(74) *Attorney, Agent, or Firm* — Wilmer Cutler Pickering Hale and Dorr LLP (57) ABSTRACT

A server transmits a probe packet to a terminal, estimates a bandwidth of the network based on information returned from the terminal, calculates a rate used for performing compression coding of screen information and/or an accompanying audio signal, generated by an application on a virtual terminal on the server, so as not to exceed the estimated bandwidth, encodes the screen information and/or the accompanying audio signal at the calculated rate, stores the encoding result in a packet of a predetermined protocol to transmit the packet.

12 Claims, 3 Drawing Sheets

(51) Int. Cl.
*H04L 12/26* (2006.01)
*H04L 29/08* (2006.01)
*H04L 12/811* (2013.01)

(58) Field of Classification Search
USPC .......................................... 345/555; 375/240
See application file for complete search history.

(56) References Cited

U.S. PATENT DOCUMENTS

| | | |
|---|---|---|
| 2009/0083432 A1 | 3/2009 | Saito et al. |
| 2010/0195521 A1 | 8/2010 | Wanstedt et al. |
| 2011/0153816 A1 | 6/2011 | Lloyd et al. |
| 2013/0039177 A1 | 2/2013 | Ozawa |
| 2014/0254613 A1 | 9/2014 | Lloyd et al. |

FOREIGN PATENT DOCUMENTS

| | | |
|---|---|---|
| EP | 1 521 476 A1 | 4/2005 |
| JP | 2000-069088 A | 3/2000 |
| JP | 2004-254025 A | 9/2004 |
| JP | 2005-110267 A | 4/2005 |
| JP | 2009-060425 A | 3/2009 |
| JP | 2010-087950 A | 4/2010 |
| JP | 2010-237726 A | 10/2010 |
| JP | 2010-238126 A | 10/2010 |
| TW | I348845 B | 9/2011 |
| TW | I353141 B | 11/2011 |
| TW | I355157 B | 12/2011 |
| WO | WO-2005/022845 A1 | 3/2005 |
| WO | WO-2011-142311 A1 | 11/2011 |
| WO | WO 2011142311 A1 * | 11/2011 .............. H04W 4/18 |

OTHER PUBLICATIONS

Taiwanese Office Action issued by The Taiwan Patent Office for Application No. 10420512690 dated Apr. 22, 2015 (3 pages).
Korean Office Action with Japanese and English translation corresponding to Korean Application No. 10-2015-7001358, dated Sep. 23, 2015, 20 pages.
Japanese Office Action with English translation corresponding to Japanese Application No. 2014-526926, Oct. 20, 2015, 4 pages.
Chinese Notification of First Office Action issued by The State Intellectual Property Office of the People's Republic of China in corresponding Chinese Patent Application No. 201380039696.2, dated Nov. 28, 2016, 25 pages.
International Search Report corresponding to PCT/JP2013/069874, dated Oct. 29, 2013 (3 pages).
Extended European Search Report issued in corresponding European Application No. 13823571.8, dated Mar. 2, 2016, 7 pages.
Chinese Office Action issued by the State Intellectual Property Office of the People's Republic of China for Chinese Application No. 201380039696.2 dated Jul. 4, 2017 (20 pages).

* cited by examiner

COMMUNICATION SYSTEM, METHOD AND PROGRAM

CROSS-REFERENCE TO RELATED APPLICATIONS

This application is a national stage application of International Application No. PCT/JP2013/069874 entitled "Communication System, Method and Program," filed on Jul. 23, 2013, which claims the benefit of the priority of Japanese Patent Application No. 2012-163958, filed on Jul. 24, 2012, the disclosures of each which are incorporated herein in their entirety. The present invention relates to a communication system, method and program.

TECHNICAL FIELD

Background

Figure 3:
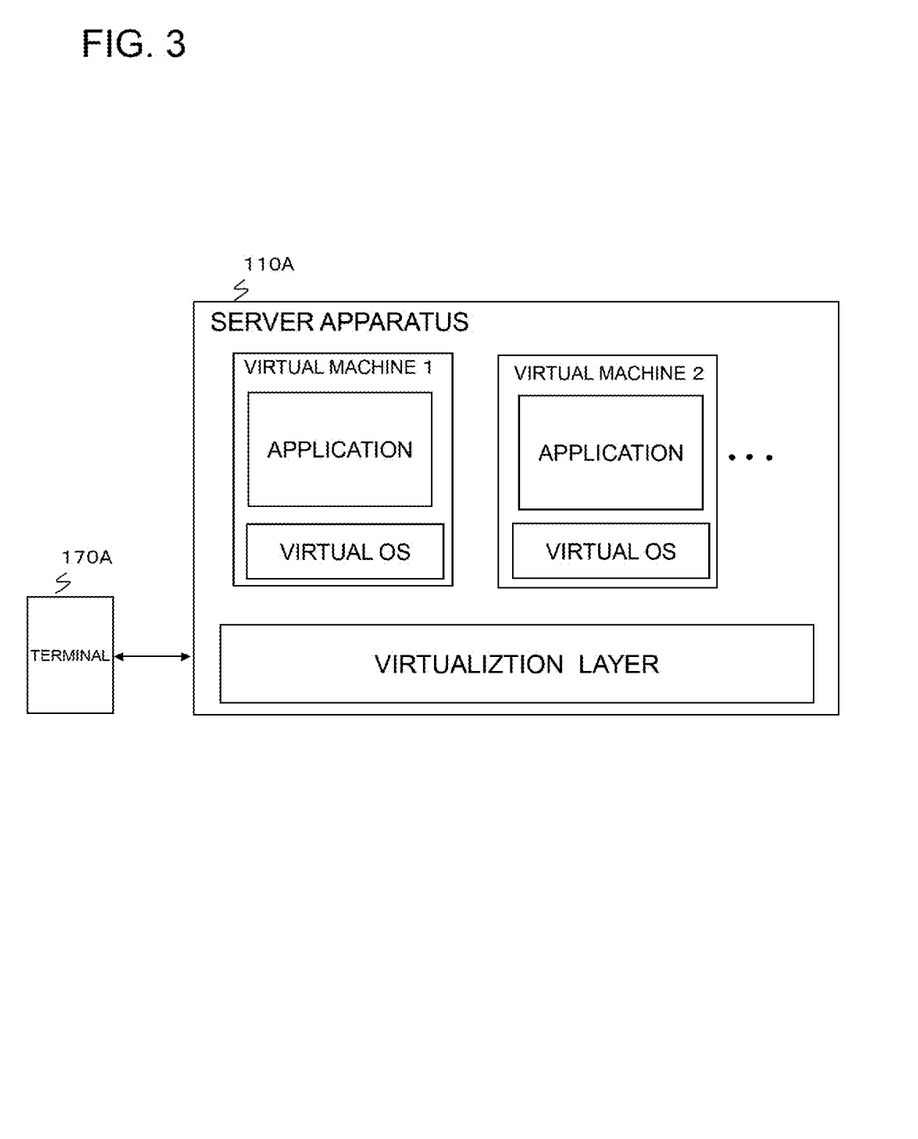
FIG. 3 is a diagram describing an outline of a virtual machine-type of thin client system.

A thin client system has begun to be in wide spread use in enterprises and so forth in order to ensure advanced security. There are various types of implementation of the thin client system. A system using virtual machines as illustrated in FIG. 3, for example, is known. The virtual machines (also referred to as "virtual terminals" or "virtual clients") are provided on a virtualization layer, for example, in a server apparatus 110A. Then, a virtual OS (Operating System) (also referred to as a "client OS") and an application are executed on each virtual machine. A terminal 170A connects for communication to the server apparatus 110A via a network, and operates a virtual terminal on the server apparatus 110A to make an application run, as if to operate a real terminal, thereby generating, for example, screen information. The application on the virtual terminal transmits the screen information to the terminal 170A and displays the screen information on a display apparatus of the terminal 170A. The terminal A in such a system is also referred to as a thin client terminal. Connection to the virtual terminal (virtualization version of the terminal 170A) on the server apparatus 110A can be made, based on a log-in ID and terminal identification information from the terminal 170A, and an access to the server apparatus can be made from the terminal 170A at home or outside the home, and connection to the virtual terminal of its own (terminal 170A) can be safely made to execute an operation. Since no data is left in the terminal 170A, confidential information and enterprise information do not leak to an outside, even if a user has lost the terminal 170A, for example.

The following Patent Literatures 1 to 3 have been searched in the prior document search with regards to the present application. For example, Patent Literature 1 discloses a system in which communication quality is measured for a communication line A between a relay server and a terminal, delivery volume is identified for video data in a communication line B between a relay server and a video transmission server corresponding to screen information volume in communication data amount permitted by measured communication quality of the communication line, control is performed so that volume of video data transmitted to the relay server from the video transmission server via the communication line B becomes the identified delivery volume of the video data, and transmission to a client of screen information accompanying video reproduction by the server corresponds to network quality.

Patent Literature 2 discloses a thin client system in which a thin client server controls transmission data amount in accordance with a network line state, and by receiving data by buffering data transmitted from the thin client server, a thin client terminal (car navigation apparatus) mitigates influence of the network line state, and enables smooth data reproduction on the client side.

Patent Literature 3 discloses an arrangement in which a system comprises a server apparatus that includes an application detection means that detects an application being used by an information processing apparatus (client) that is a destination to which compressed data is forwarded; a parameter information holding means that associates and holds a parameter(s) related to the compressed data and information of the application; and a parameter setting means that reads a parameter(s), corresponding to information of the application that is being in use and detected by the application detection means, from the parameter information holding means, to be set as a parameter(s) used for data compression, wherein data created based on an application program started up on the server side, is forwarded to a client side. The system is configured to make it possible to adjust compression parameters without a user manual operation.

Patent Literature 4 discloses a thin client system provided with: a server comprising a measurement unit that measures network line speed, an output range calculation unit that calculates output area that can be displayed by transmitting a video to a terminal side in a bandwidth corresponding to the line speed, an output range generation unit that generates a region in which video is preferentially compressed, the video being specified based on information of a display region specified by the terminal, a video compression unit that compresses the video based on the region, and a server side transmission unit that transmits to the terminal the compressed video; and a terminal (thin client) comprising an output range specifying unit in which the display region to be preferentially displayed is specified by a user, a terminal side transmission unit that transmits to a server side reception unit information of the instructed display region, a reception unit that receives video including the compressed video from the server, and a video expansion unit that expands and outputs video received by the reception unit, wherein the system enables a smooth display by the thin client.

Patent Literature 1 to 4 do not disclose a system that suppresses image quality degradation in a thin client terminal, such as delay in screen updating from a server or screen distortion.

Patent Literature

[PTL 1]
Japanese Patent Kokai Publication No. JP2009-060425A
[PTL 2]
Japanese Patent Kokai Publication No. JP2010-087950A
[PTL 3]
Japanese Patent Kokai Publication No. JP2010-237726A
[PTL 4]
Japanese Patent Kokai Publication No. JP2010-238126A

SUMMARY

An analysis of the related arts will be given below. The following discusses problems in a communication system in which a terminal such as a mobile terminal or the like is connected via a network, and information, which is generated by an application that is made to run on a virtual client of a server through an operation on the terminal, is forwarded to the terminal and displayed on the terminal.

In the case wherein a thin client mainly is used via a mobile packet network or an LTE (Long Term Evolution)/ EPC (Evolved Packet Core) network, since bandwidth of the mobile network varies in time, depending on traffic volume and distance between a terminal and a base station, packet stagnation or packet loss occurs in the mobile network due to the bandwidth variation.

As a result, it takes time for a terminal to receive information from a server apparatus, and there is a problem in that QoE (Quality of Experience), which is a service quality that a user experiences, degrades, where screen updating is delayed, or screen distortion occurs.

Therefore, the present invention has been invented in view of the abovementioned problems and it is an object of the invention to provide a communication system, a server apparatus, a method and a program, to suppress image quality degradation in a terminal that receives and displays screen information from a server apparatus, such as screen distortion or delay in screen updating from the server apparatus.

According to the present invention, there is provided a communication system that includes a server apparatus adapted to transmit information, generated by an application made to run on a virtual terminal provided on the server apparatus responsive to an operation on a terminal that connects to the server apparatus via a network, to the terminal via the network, wherein the server apparatus comprises:

a packet transceiver unit that transmits a probe packet at predetermined timing to the terminal via the network, and that receives a reply packet returned via the network from the terminal receiving the probe packet;

a bandwidth estimation and rate control unit that estimates a bandwidth of the network based on information included in the reply packet received by the packet transceiver unit, calculate a rate used in an encoder unit when performing compression coding of at least one of screen information and an audio signal accompanying the screen information, generated by the application on the virtual terminal, to a value that does not exceed the estimated bandwidth, and that gives an instruction of the calculated rate to the encoder unit;

the encoder unit that set a rare for compression coding to the rate instructed by the bandwidth estimation and rate control unit, and performs compression coding of at least one of the screen information and the audio signal accompanying the screen information; and a packet transmission unit that stores output from the encoder unit in a packet of a predetermined protocol to transmit the packet to the terminal via the network.

According to the present invention, there is provided a server apparatus comprising a virtual terminal;

an application that is invoked on the virtual terminal provided on the server apparatus responsive to an operation on the terminal connected to the server apparatus via the network, the information generated by the application on the virtual terminal being transmitted to the terminal via the network;

a packet transceiver unit that transmits a probe packet at predetermined timing to the terminal via the network, and receives a reply packet returned via the network from the terminal receiving the probe packet;

a bandwidth estimation and rate control unit that estimates a bandwidth of the network based on information included in the reply packet received by the packet transceiver unit, calculates a rate used in an encoder unit when performing compression coding of at least one of screen information and an audio signal accompanying the screen information, generated by the application on the virtual terminal, to a value that does not exceed the estimated bandwidth, and gives an instruction of the calculated rate to the encoder unit;

the encoder unit that sets a rate for compression coding to the rate instructed by the bandwidth estimation and rate control unit, and performs compression coding of at least one of screen information and an audio signal accompanying the screen information; and a packet transmission unit that stores output from the encoder unit in a packet of a predetermined protocol and transmits the packet to the terminal via the network.

According to the present invention, there is provided a communication method for a server apparatus adapted to transmit information, generated by an application made to run on a virtual terminal provided on the server apparatus, responsive to an operation on a terminal connected to the server apparatus via a network, to the terminal via the network, the method comprising:

transmitting a probe packet at predetermined timing to the terminal via the network;

receiving a reply packet returned via the network from the terminal that receives the probe packet, and estimating a bandwidth of the network based on information included in the reply packet;

calculating a rate used in an encoder unit compression coding of at least one of screen information and an audio signal accompanying the screen information, generated by the application on the virtual terminal, to a value that does not exceed the estimated bandwidth;

using the calculated and performing compression coding of at least one of the screen information and the audio signal accompanying the screen information; and storing the compression coding result in a packet of a predetermined protocol to transmit the packet.

According to the present invention, there is provided a non-transitory computer readable recording medium storing a program therein, the program causing a computer forming a server apparatus adapted to transmit information, generated by an application made to run on a virtual terminal on the server apparatus, responsive to an operation on a terminal connected via the network, to the terminal via the network, to execute the processing comprising:

transmitting a probe packet at predetermined timing to the terminal via the network, and receiving a reply packet returned via the network from the terminal receiving the transmitted probe packet;

estimating a bandwidth of the network based on information included in the reply packet received by the packet transceiver unit, and calculating a rate used for performing compression coding of at least one of screen information and an audio signal accompanying the screen information, generated by the application on the virtual terminal, to a value that does not exceed the estimated bandwidth;

using the calculated, performing compression coding of at least one of the screen information and an audio signal accompanying the screen information; and a packet transmission processing that storing the compression coding result in a packet of a predetermined protocol to transmit the packet to the terminal via the network.

According to the present invention, there is provided a computer readable recording medium (memory apparatus, optical recording medium (apparatus), magnetic storage medium (apparatus)) that records the program in question.

According to the present invention, it is possible to suppress image quality degradation such as screen distortion or delay in screen updating from a server apparatus, in a terminal.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

DETAILED DESCRIPTION

A description is given of an exemplary embodiment of the present invention, making reference to the drawings.

First Exemplary Embodiment

Figure 1:
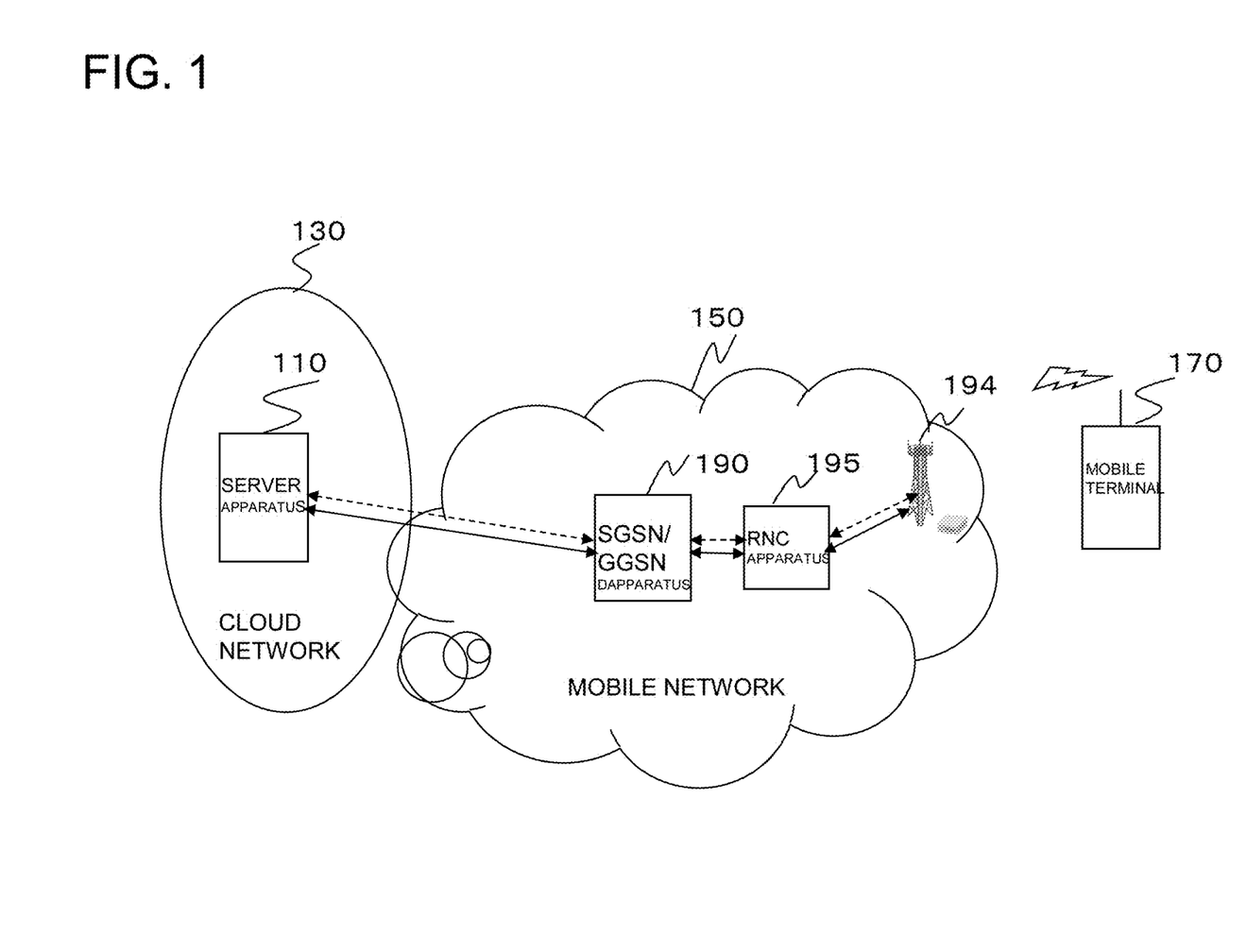
FIG. 1 is a diagram illustrating a connection configuration of an exemplary embodiment of the present invention.

FIG. 1 is a diagram illustrating an arrangement of a first exemplary embodiment of the present invention. A configuration is illustrated of a case of using a mobile 3G network as a network, and a SGSN (Serving GPRS (General Packet Radio Service) Support Node)/GGSN (Gateway GPRS Support Node) apparatus as a packet forwarding apparatus. Here, a SGSN apparatus and a GGSN apparatus are integrated in the SGSN/GGSN apparatus. A server apparatus 110 required for a thin client is arranged in a cloud network 130, and in the illustrated configuration the cloud network 130 and a mobile network 150 are connected. The cloud network 130 provides a network infrastructure for cloud computing, and may be an IP-VPN (Virtual Private Network) built by connecting IP networks and the Internet. With using virtualization technology, regarding server resource, storage resource or the like, improvement of usage efficiency of resource among users, ensuring security by resource separation and so forth are carried out.

In FIG. 1, a terminal (mobile terminal) 170 transmits an operation signal to the server apparatus 110 via a base station 194, an RNC (Radio Network Controller) apparatus 195 and the SGSN/GGSN apparatus 190, in the mobile network 150, in order to operate a virtual client unit (virtual terminal corresponding to the terminal 170) in the server apparatus 110 arranged in the cloud network 130. Here, the operation signal indicates a signal transmitted from the mobile terminal 170 responsive to an operation such as a key operation, a touch operation to a screen, text input, or the like, on the mobile terminal 170.

The operation signal transmitted from the mobile terminal 170 arrives at the server apparatus 110 in the cloud network 130 via the base station 194, the RNC apparatus 195, and the SGSN/GGSN apparatus 190, in the mobile network 150.

The operation signal is received by the server apparatus 110. A known protocol may be used as a protocol for the operation signal. Although there is no particular limitation, in the present exemplary embodiment TCP (Transmission Control Protocol)/IP (Internet Protocol) and, as an upper layer thereof, HTTP (Hyper Text Transport Protocol) are used. It is to be noted that, outside of HTTP, it is possible to use SIP (Session Initiation Protocol) or the like. Note that SGSN and GGSN need not be integrated, and may be arranged in separate nodes.

Figure 2:
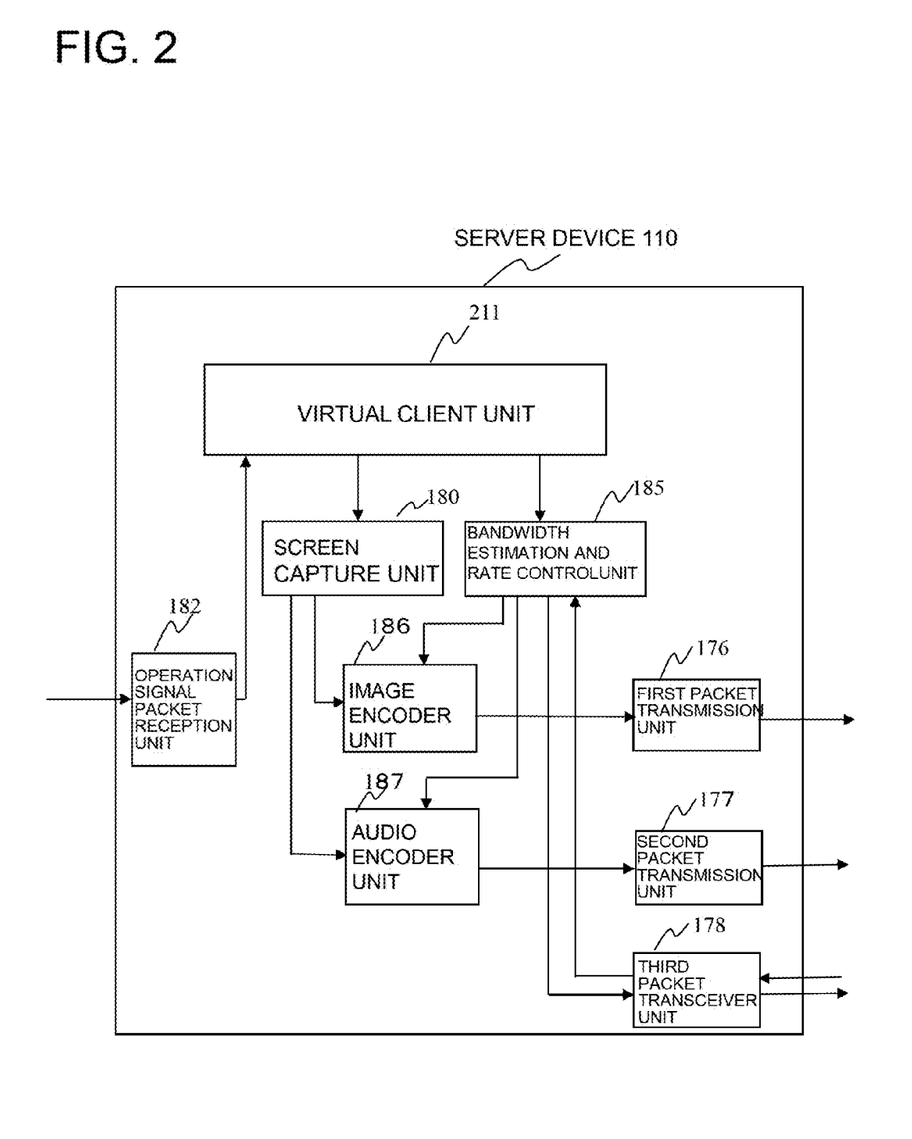
FIG. 2 is a diagram illustrating a configuration of a server apparatus in an exemplary embodiment of the present invention.

FIG. 2 is a diagram illustrating a configuration example of the server apparatus 110. Referring to FIG. 2, the server apparatus 110 includes a virtual client unit 211, an operation signal packet reception unit 182, a bandwidth estimation and rate control unit 185, a screen capture unit 180, an image encoder unit 186, an audio encoder 187, a first packet transmission unit 176, a second packet transmission unit 177, and a third packet transceiver unit 178. The virtual client unit (virtual terminal) 211 operates on a guest OS (virtual OS) in a virtual machine implemented on a virtualization layer provided on a host OS not illustrated in the drawings. Here, for each of the host OS and the guest OS, a known OS may be used. In the following, as an example, Linux (registered trademark) is used as the host OS, and Android (registered trademark) is used as the guest OS, but it is also possible to use another OS, for example Windows (registered trademark), for the latter. It is to be noted that a virtualization mechanism is not limited to a host OS type, in which virtualization software is installed on a specific host OS and a virtual machine is run on the virtualization software, and a virtualization mechanism may be implemented as a hypervisor type that does not require a host OS.

The virtual client unit 211 includes:
application software corresponding to a service,
a screen generation unit,
a cache memory, and
speech/still-image/video decoder and so forth (none of which are illustrated in the drawings). It is to be noted that an application software of the virtual client unit 211 corresponds to an application in the virtual machine of FIG. 3; the screen generation unit and the speech/still-image/video decoder are implemented on a virtual machine (virtual client unit) associated with a terminal, for example; and the cache memory is basically allocated to each virtual machine (virtual client unit).

The application software (not shown in the drawings) in the virtual client unit 211 is easily updated from outside the server apparatus 110.

In the server apparatus 110 a TCP packet that is an operation signal from the mobile terminal 170 is received by the operation signal packet reception unit 182 via the base station 194, the RNC apparatus 195, and the SGSN/GGSN apparatus 190.

The operation signal packet reception unit 182 extracts an operation signal from a received TCP/IP packet, and outputs to the virtual client unit 211.

The virtual client unit 211 analyzes the operation signal supplied from the operation signal packet reception unit 182 and starts up application software (not shown in the drawings) corresponding to the operation signal.

The application software (not shown in the drawings) invoked by the virtual client unit 211 generates screen information (processing result of the application software) to be displayed on a display apparatus (not shown in the drawings) of the mobile terminal 170, with a predetermined screen resolution.

The screen capture unit 180 captures screen information output from the application software (not shown in the drawings) of the virtual client unit 211, with the predetermined screen resolution and frame rate (the number of frames per second).

The screen capture unit 180 converts captured screen information to a luminance signal and color-difference signal, and outputs to the image encoder unit 186. The screen capture unit 180 may also use a different format, for example, YUV format (Y: luminance signal, U(B-Y): color-difference signal Cb, V(R-Y) color-difference signal Cr), or the like.

The image encoder unit 186 receives an image signal according to the predetermined screen resolution and frame rate, as an image signal from the screen capture unit 180, and receives a bandwidth estimation value at each of predetermined points in time from the bandwidth estimation and rate control unit 185.

The image encoder unit 186 generates a compression coded bit stream by compression coding the image signal output from the screen capture unit 180, according to a predetermined compression coding scheme, to be transmitted to the first packet transmission unit 176. At this time, the image encoder unit 186 controls the bit rate so as not to exceed the bandwidth estimation value, and performs compression coding of the image signal.

As the predetermined compression coding scheme used by the image encoder unit 186, it is possible to use a known coding scheme, for example, H.264, MPEG (Moving Picture Experts Group)-4, JPEG (Joint Photographic Experts Group) 2000, JPEG, or the like. In the present exemplary embodiment, H.264 is used as an example.

The first packet transmission unit 176 stores the compression coded bit stream output from the image encoder unit 186, in a payload of a packet to build the packet according to a predetermined protocol, and transmits the packet to the SGSN/GGSN apparatus 190. In the present exemplary embodiment, as the predetermined protocol it is possible to use a known protocol, RTP (Real-time Transport Protocol)/UDP (User Data Protocol)/IP (Internet Protocol), or UDP/IP, or TCP (Transmission Control Protocol)/IP. In the present exemplary embodiment, UDP/IP is used.

It is to be noted that, as another configuration of the first packet transmission unit 176, the compression coded bit stream may be stored temporarily in an MP4 or 3GP file, and the file may be transmitted by packets. For the protocol in this case, TCP/IP may be used, for example.

The SGSN/GGSN apparatus 190 receives packets transmitted from the server apparatus 110 and forwards them to the RNC apparatus 195 by tunneling according to GTP-U (GPRS Tunneling Protocol for User plane). The RNC apparatus 195 wirelessly transmits the packets in question to the mobile terminal 170 through the base station 194.

The mobile terminal 170 receives the packets from the first packet transmission unit 176 of the server apparatus 110 via the mobile network 150, and extracts the compression coded bit stream stored in the packets in question. Installed in the mobile terminal 170 is a decoder (not shown in the drawings) corresponding to the image encoder unit 186 that is installed in the server apparatus 110; decoding of the compression coded bit stream is performed by the decoder, and the decoded screen is displayed on a display apparatus (not shown in the drawings) of the mobile terminal.

In FIG. 2, in order to estimate the bandwidth of the network, the bandwidth estimation and rate control unit 185 issues an instruction to the third packet transceiver unit 178 at predetermined timing, to transmit a specific packet (probe packet).

The third packet transceiver unit 178 transmits continuously 2 or more specific packets, for example, to the mobile terminal 170 in accordance with the instruction from the bandwidth estimation and rate control unit 185, at timing of reception of the instruction.

The third packet transceiver unit 178 includes in the specific packet (probe packet) information of at least:
data size of the specific packet (probe packet), and
transmission time of the specific packet (probe packets) from the server apparatus.

The protocol used in transmission and reception of the specific packet by the third packet transceiver unit 178 is the same as the protocol used by the first packet transmission unit 176. In the present exemplary embodiment, UDP/IP is used.

The third packet transceiver unit 178 receives reply packets from the mobile terminal 170 in response to the specific packets (probe packets) that have been continuously transmitted.

The reply packet from the mobile terminal 170 include information of:
data size of the specific packet (probe packet),
transmission time of the specific packet (probe packet) from the server apparatus 110, and
reception time of the specific packet (probe packet) from the mobile terminal 170.

The third packet transceiver unit 178 extracts from the packet (reply packet) received from the mobile terminal 170, information of:
data size of the specific packet (probe packet),
transmission time of the specific packet (probe packet) from the server apparatus 110, and
reception time of the specific packet (probe packet) from the mobile terminal 170,
and outputs the extracted information to the bandwidth estimation and rate control unit 185.

The bandwidth estimation and rate control unit 185 receives information of:
data size of the specific packet (probe packet),
transmission time of the specific packet (probe packet) from the server apparatus 110, and
reception time of the specific packet (probe packet) at the mobile terminal 170,
and performs sorting in order of transmission time, and calculates a bandwidth estimation value W in accordance with the following equation, at each of predetermined points in time.

$$\sum_{j=2}^{N} D(j)/W = R(N) - R(1) \quad (1)$$

Therefore, $$W = \sum_{j=2}^{N} D(j)/(R(N) - R(1))$$

In the equation (1) above, D(j) is a packet size of j-th specific packet (probe packet) transmitted to the mobile terminal 170 by the third packet transceiver unit 178 of the server apparatus 110. R(N) is a time of reception at the mobile terminal 170 of an N-th specific packet transmitted from the server apparatus 110. R(1) is a time of reception at the mobile terminal 170 of a first specific packet transmitted from the server apparatus 110.

Next, the bandwidth estimation and rate control unit 185 performs time-wise smoothing of the bandwidth estimation value W according to the following equation.

$$B(n)=(1-\beta)\times B(n-1)+\beta\times W \quad (2)$$

Here, B(n) indicates a bandwidth estimation value after smoothing at the n-th point in time. β is a constant in a range of 0<β<1.

Next, using the smoothed bandwidth estimation value B(n), the bandwidth estimation and rate control unit 185 calculates a bit rate C(n) of an image encoder in accordance with the following equation, at each predetermined point in time, and C(n) is output to the image encoder unit 186 every predetermined time-period.

$$C(n)=(1-\gamma)\times C(n-1)+\gamma\times B(n) \quad (3)$$

$$C(n)\leq B(n) \quad (4)$$

In the above equation (3), C(n) indicates the bit rate at the n-th point in time. γ is a constant in a range of 0<γ<1. The above equation (4) represents a condition whereby the bit rate C(n) in compression coding by the image encoder does not exceed the bandwidth estimation value B(n).

The screen capture unit 180 captures a screen generated by a screen generation unit (not shown in the drawings) of the virtual client unit 211 at a predetermined screen resolution and a predetermined frame rate (number of frames per second), and outputs to the image encoder unit 186.

The image encoder unit 186 receives a screen signal at a predetermined screen resolution and a predetermined frame rate from the screen capture unit 180, and receives the bit rate C(n) of the image encoder at each predetermined time from the bandwidth estimation and rate control unit 185.

In addition, the image encoder unit 186 calculates a screen resolution VR and a frame rate fps of the image encoder from the bit rate C(n) of the image encoder, and uses H.264 image compression coding scheme, for example, to perform compression coding of a screen signal according to VR and fps and obtain a compression coded bit stream, to be output to the first packet transmission unit 176.

The first packet transmission unit 176 receives the compression coded stream from the image encoder unit 186, builds a packet according to UDP/IP, and after storing the stream in the payload part of the packet, transmits the packet to the mobile terminal 170.

Next, in a case where an audio signal accompanies image information generated by the virtual client unit 211, the screen capture unit 180 reads the accompanying audio, and outputs the read audio signal to the audio encoder unit 187.

The audio encoder unit 187 receives the audio signal, performs compression coding by a predetermined compression scheme to obtain the compression coded stream, and outputs the compression coded stream to the second packet transmission unit 177. Here, a known system, such as MPEG-4 AAC (Advanced Audio Coding), Enhanced AAC or the like, may be used in the compression coding scheme for the audio signal. In the present exemplary embodiment, MPEG-4 AAC is used.

The second packet transmission unit 177 receives the compression coded stream from the audio encoder unit 187, builds a packet according to UDP/IP, and after storing the stream in the payload part of the packet, transmits the packet to the mobile terminal 170.

In FIG. 1, the mobile network 150 may be a mobile LTE/EPC network, and it is also possible to have a wireless LAN (Local Area Network), such as a WiMAX (Worldwide Interoperability for Microwave Access) network or WiFi (Wireless Fidelity). In addition, it is possible to have a fixed network or an NGN (Next Generation Network). Note that in this case, connection is not from a mobile terminal but from a fixed terminal or a PC (Personal Computer). In this case, the server apparatus 110 includes a virtual PC as a virtual machine, in which a PC is virtualized as a virtual terminal.

In FIG. 1, the server apparatus 110 is arranged in the cloud network 130, but it may also be arranged in the Internet. In the case where a server apparatus of a thin client is provided in an enterprise, it is possible to arrange the server apparatus in a network of the enterprise. In the case where a telecommunication carrier itself provides a thin client server, it is also possible to arrange the sever apparatus 110 in the mobile network 150 or in a fixed network or an NGN.

It is to be noted that the bandwidth estimation in the bandwidth estimation and rate control unit 185 of FIG. 2 is not limited to the methods described above (equations (1) to (4), etc.), and it is possible to use other methods.

It is possible to use other known methods as a compression coding scheme of the image encoder unit 186 or the audio encoder unit 187. It is possible to use other known protocols as a packet protocol for the first packet transmission unit 176, the second packet transmission unit 177, and the third packet transceiver unit 178.

In the bandwidth estimation and rate control unit 185, an instruction regarding a bit rate is given to the image encoder unit 186, but when a bit rate is calculated from a bandwidth estimation value, it is possible to change to calculating not only a bit rate of the image encoder, but also a total bit rate including a bit rate of the audio encoder. By so doing, it is possible to make a change so as to control respective bit rates for both the image encoder unit 186 and the audio encoder unit 187.

Respective parts of FIG. 2 may be implemented by a program that runs in a computer configuring the server apparatus 110. According to the present invention, there is provided a computer readable recording medium (memory apparatus, optical recording medium (apparatus), magnetic storage medium (apparatus)) that records the program.

According to the present invention, in the case of implementing a thin client system via a mobile packet network or an LTE/EPC network, it is made possible to control a bit rate of a compression coded stream transmitted from a server apparatus following temporal variation of a network bandwidth, and hence it is possible to suppress occurrence of packet stagnation and packet loss in the network. As a result, it is possible to suppress degradation in QoE (Quality of Experience) such as screen distortion or delay in updating a screen on a terminal side that receives and displays screen information from the server apparatus.

It is to be noted that the various disclosures of the abovementioned Patent Literature are incorporated herein by reference thereto. Modifications and adjustments of exemplary embodiments and examples may be made within the bounds of the entire disclosure (including the scope of the claims) of the present invention, and also based on fundamental technological concepts thereof. Furthermore, various combinations and selections of various disclosed elements (including respective elements of the respective claims, respective elements of the respective exemplary embodiments, respective elements of the respective drawings, and the like) are possible within the scope of the claims of the present invention. That is, the present invention clearly includes every type of transformation and modification that a person skilled in the art can realize according to the entire disclosure including the scope of the claims and to technological concepts thereof. In particular, in response to numerical ranges described in the present specification, arbitrary numerical values or small ranges included in the relevant ranges should be interpreted to be specifically described even where there is no particular description thereof.

The invention claimed is:

1. A server apparatus comprising:
    a virtual terminal;
    an application that is invoked on the virtual terminal responsive to an operation on a first terminal connected to the server apparatus via a network, information generated by the application on the virtual terminal being transmitted to the first terminal via the network;
    a packet transceiver configured to transmit a probe packet at predetermined timing to the first terminal via the network, and receive a reply packet returned via the network from the first terminal receiving the probe packet;
    an encoder configured to perform compression coding of at least one of screen information and an audio signal accompanying the screen information;
    a bandwidth estimation and rate control processor configured to estimate a bandwidth of the network based on information included in the reply packet, calculate a rate used in the encoder when performing compression coding of at least one of the screen information and the audio signal accompanying the screen information, and give an instruction of the calculated rate to the encoder, wherein the screen information and the audio signal are generated by the application on the virtual terminal, the calculated rate is a value that does not exceed the estimated bandwidth, and the encoder is configured to set a rate for compression coding to the calculated rate instructed by the bandwidth estimation and rate control processor; and
    a packet transmitter configured to store an output from the encoder in a first packet of a predetermined protocol and transmit the first packet to the first terminal via the network, wherein the bandwidth estimation and rate control processor is configured to
    receive information extracted from the reply packet, wherein the information includes a data size of the probe packet, a transmission time of the probe packet at the server apparatus, and a reception time of the probe packet at the first terminal;
    perform sorting in order of transmission time and calculate a bandwidth estimation value W by the following equation:

$$W = \sum_{j=2}^{N} D(j)/(R(N) - R(1))$$

where D(j) is a packet size of j-th probe packet transmitted to the first terminal by the packet transceiver, and R(N) and R(1) are each a time of reception at the first terminal of an N-th and a first probe packets transmitted from the packet transceiver; and perform time-wise smoothing of the bandwidth estimation value W according to the following equation to obtain a bandwidth estimation value B(n):

$$B(n)=(1-\beta)\times B(n-1)+\beta\times W$$

where B(n) is a bandwidth estimation value after smoothing at an n-th point in time, and $\beta$ is a constant in a range of $0<\beta<1$.

2. The server apparatus according to claim 1, wherein using the smoothed bandwidth estimation value B(n), the bandwidth estimation and rate control processor calculates a bit rate C(n) used in the encoder in accordance with the following equation, at each predetermined point in time:

$$C(n)=(1-\gamma)\times C(n-1)+\gamma\times B(n)$$

where C(n) is a bit rate at an n-th point in time, $\gamma$ is a constant in a range of $0<\gamma<1$, and B(b) is a bandwidth estimation value after smoothing, and where the bit rate C(n) is less than or equal to B(n).

3. A communication system comprising:
    a server apparatus as set forth in claim 1; and
    a terminal that connects to the server apparatus via a network.

4. A communication method for a server apparatus adapted to transmit information to a first terminal connected to the server apparatus via a network, the transmitted information generated by an application configured to run on a virtual terminal of the server apparatus, the transmission of the information being responsive to an operation on the first terminal the method comprising:
    transmitting a probe packet at predetermined timing to the first terminal via the network;
    receiving a reply packet returned via the network from the first terminal that receives the probe packet, and estimating a bandwidth of the network based on information included in the reply packet;
    calculating a rate used for performing compression coding of at least one of screen information and an audio signal accompanying the screen information, generated by the application on the virtual terminal, wherein the calculated rate is a value that does not exceed the estimated bandwidth;
    using the calculated rate to perform compression coding of at least one of the screen information and the audio signal accompanying the screen information; and
    storing the compression coding result in a packet of a predetermined protocol to transmit the packet, wherein the method further comprises:
    based on information extracted from the reply packet, the information includes data size of the probe packet, transmission time of the probe packet at the server apparatus, and reception time of the probe packet at the first terminal,
    performing sorting in order of transmission time and calculating a bandwidth estimation value W by the following equation:

$$W = \sum_{j=2}^{N} D(j)/(R(N) - R(1))$$

where D(j) is a packet size of j-th probe packet transmitted to the first terminal, R(N) and R(1) are each a time of reception at the first terminal of an N-th and a first probe packets; and performing time-wise smoothing of the bandwidth estimation value W according to the following equation to obtain a bandwidth estimation value B(n):

$$B(n)=(1-\beta)\times B(n-1)+\beta\times W$$

where B(n) is a bandwidth estimation value after smoothing at an n-th point in time, and β is a constant in a range of 0<β<1.

5. The communication method according to claim 4, comprising:
using the smoothed bandwidth estimation value B(n), calculating a bit rate C(n) for compression coding in accordance with the following equation, at each predetermined point in time:

$$C(n)=(1-\gamma)\times C(n-1)+\gamma\times B(n)$$

where C(n) is a bit rate at an n-th point in time, γ is a constant in a range of 0<γ<1, and B(b) is a bandwidth estimation value after smoothing, and where the bit rate C(n) is less than or equal to B(n).

6. The server apparatus according to claim 1, wherein the packet transceiver continuously transmits a plurality of the probe packets to the first terminal at timing of reception of the instruction from the bandwidth estimation and rate control processor,
the packet transceiver includes information of at least data size of the probe packet and transmission time by the server apparatus of the probe packet in the probe packet,
the packet transceiver receives a plurality of the reply packets from the first terminal in response to a plurality of the probe packets transmitted continuously; and
the packet transceiver extracts information of data size of the probe packet, transmission time of the probe packet at the server apparatus, and reception time of the probe packet at the terminal, and outputs the extracted information to the bandwidth estimation and rate control processor.

7. The server apparatus according to claim 1, further comprising:
a screen capture processor configured to capture screen information generated by the application on the virtual terminal at a predetermined screen resolution and a predetermined frame rate;
wherein the encoder comprises:
a first image encoder configured to receive a screen signal from the screen capture processor at a predetermined screen resolution and a predetermined frame rate, receive from the bandwidth estimation and rate control processor a bit rate of an image encoder at each of predetermined points in time, calculate a screen resolution and a frame rate of the image encoder from the bit rate of the image encoder, perform compression coding of the screen signal, and output a compression coded stream, and
wherein the packet transmitter comprises
a first packet transmitter configured to receive the compression coded stream from the image encoder, packetize the compression coded stream into the first packet, and transmit the first packet to the first terminal.

8. The server apparatus according to claim 7, wherein the encoder comprises
an audio encoder configured to perform compression coding according to a predetermined compression scheme of an audio signal output from the screen capture processor, output a compression coded stream, and when an audio signal accompanies image information generated by the application on the virtual terminal, perform compression coding according to a predetermined compression scheme of the audio signal output from the screen capture processor and output a compression coded stream, wherein
the packet transmitter comprises
a second packet transmitter configured to receive the compression coded stream from the audio encoder, packetize the compression coded stream into the first packet, and transmit the first packet to the first terminal.

9. The server apparatus according to claim 7, wherein the bandwidth estimation and rate control processor is configured to receive information of data size of the probe packet, transmission time of the probe packet at the server apparatus, and reception time of the probe packet at the terminal,
perform sorting in order of the transmission time,
calculate a bandwidth estimation value at each of predetermined points in time,
perform temporal smoothing of the bandwidth estimation value, and
using the smoothed bandwidth estimation value, calculate a value so as not to exceed the bandwidth estimation value, as a bit rate of the image encoder, at each of predetermined points in time, output the calculated bit rate to the first image encoder.

10. The communication method according to claim 4, comprising:
transmitting continuously a plurality of the probe packets to the first terminal, each of the probe packets including information of at least data size of the probe packet and transmission time of the probe packet by the server apparatus;
receiving a plurality of reply packets from the first terminal in response to a plurality of the probe packets transmitted continuously; and
extracting information of data size of the probe packet, transmission time of the probe packet by the server apparatus, and reception time of the probe packet by the first terminal to use the extracted information for estimation of the bandwidth.

11. A non-transitory computer readable recording medium storing a program therein, the program causing a computer forming a server apparatus adapted to transmit information to a first terminal via a network to execute processing, the information generated by an application configured to run on a virtual terminal of the server apparatus, the transmission of the information being responsive to an operation on the first terminal, the processing comprising:
transmitting a probe packet at predetermined timing to the first terminal via the network, and receiving a reply packet returned via the network from the first terminal receiving the transmitted probe packet;
estimating a bandwidth of the network based on information included in the reply packet, and calculating a rate used for performing compression coding of at least one of screen information and an audio signal accompanying the screen information, generated by the application on the virtual terminal, wherein the calculated rate is a value that does not exceed the estimated bandwidth;
using the calculated rate to perform compression coding of at least one of the screen information and an audio signal accompanying the screen information; and
storing the compression coding result in a packet of a predetermined protocol to transmit the packet to the first terminal via the network, wherein the processing further comprises:

based on information extracted from the reply packet, wherein the information includes data size of the probe packet, transmission time of the probe packet at the server apparatus, and reception time of the probe packet at the terminal, performing sorting in order of transmission time and calculating a bandwidth estimation value W by the following equation:

$$W = \sum_{j=2}^{N} D(j)/(R(N) - R(1))$$

where D(j) is a packet size of j-th probe packet transmitted to the first terminal, and R(N) and R(1) are each a time of reception at the first terminal of an N-th and a first probe packets; and performing time-wise smoothing of the bandwidth estimation value W according to the following equation to obtain a bandwidth estimation value B(n):

$$B(n) = (1-\beta) \times B(n-1) + \beta \times W$$

where B(n) is a bandwidth estimation value after smoothing at an n-th point in time, and $\beta$ is a constant in a range of $0 < \beta < 1$.

12. The non-transitory computer readable recording medium according to claim 11, wherein the program stored in the recording medium causes the computer to execute processing comprising:

using the smoothed bandwidth estimation value B(n), calculating a bit rate C(n) for compression coding in accordance with the following equation, at each predetermined point in time:

$$C(n) = (1-\gamma) \times C(n-1) + \gamma \times B(n)$$

where C(n) is a bit rate at an n-th point in time, $\gamma$ is a constant in a range of $0 < \gamma < 1$, and B(b) is a bandwidth estimation value after smoothing, and where the bit rate C(n) is less than or equal to B(n).

* * * * *